United States Patent [19]

Hareng et al.

[11] 4,334,734
[45] Jun. 15, 1982

[54] OPTICAL APPARATUS FOR THE REPRODUCTION OF IMAGES USING A LIQUID CRYSTAL CELL

[75] Inventors: Michel Hareng; Serge Le Berre, both of Paris, France

[73] Assignee: Thomson-CSF, Paris, France

[21] Appl. No.: 88,355

[22] Filed: Oct. 26, 1979

[30] Foreign Application Priority Data

Oct. 31, 1978 [FR] France ............................ 78 30852

[51] Int. Cl.³ ............................................. G02F 1/133
[52] U.S. Cl. ................................. 350/331 R; 350/334; 350/345
[58] Field of Search ................... 350/331 R, 334, 345; 352/198, 204

[56] References Cited

U.S. PATENT DOCUMENTS

| | | | |
|---|---|---|---|
| 3,622,226 | 11/1971 | Matthies | 350/334 |
| 4,017,157 | 4/1977 | van Riet | 350/331 X |
| 4,297,022 | 10/1981 | Lester | 350/331 R |

*Primary Examiner*—John K. Corbin
*Assistant Examiner*—Richard Gallivan
*Attorney, Agent, or Firm*—Cushman, Darby & Cushman

[57] ABSTRACT

This invention relates to an optical apparatus for the reproduction of images, comprising an optical modulator formed by a nematic liquid crystal cell the length of which is at least equal to the width of the paper to be printed, comprising on an inner surface N electrodes corresponding to the N points forming a line and a counter electrode on the other surface, this cell being placed between two polarizers. The modulator produces or does not produce extinction of the radiation for each point, depending on whether a voltage is not or is applied between the counter electrode and the electrode corresponding to the point which is to be reproduced. The light-sensitive paper travels against the second polariser and is printed by a line of light modulated spatially along the N points. To ensure that the optical modulator thus produced functions satisfactorily, the light source should flash on when the liquid crystal has reached a stable state, i.e., just before the fluctuation in the control voltage applied between the counter electrode and the electrodes.

7 Claims, 7 Drawing Figures

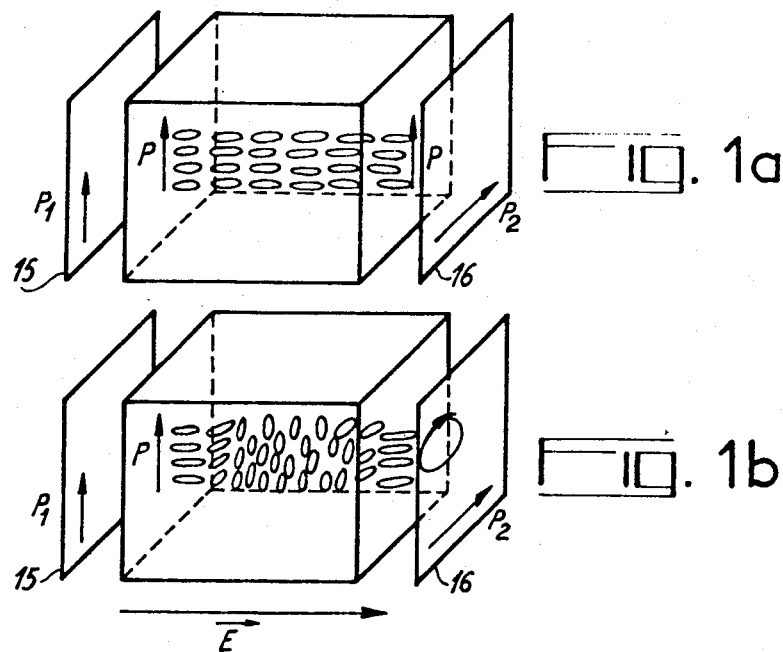
FIG. 1a
FIG. 1b
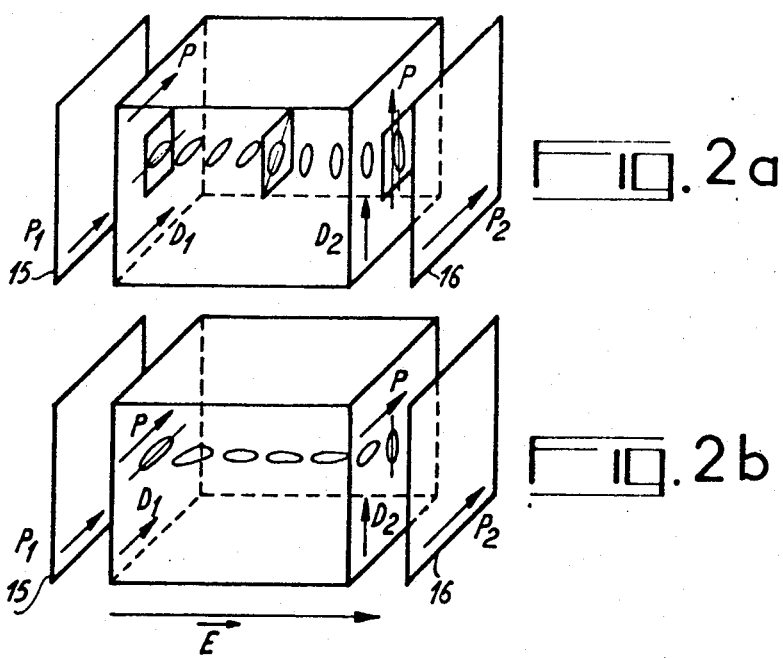
FIG. 2a
FIG. 2b

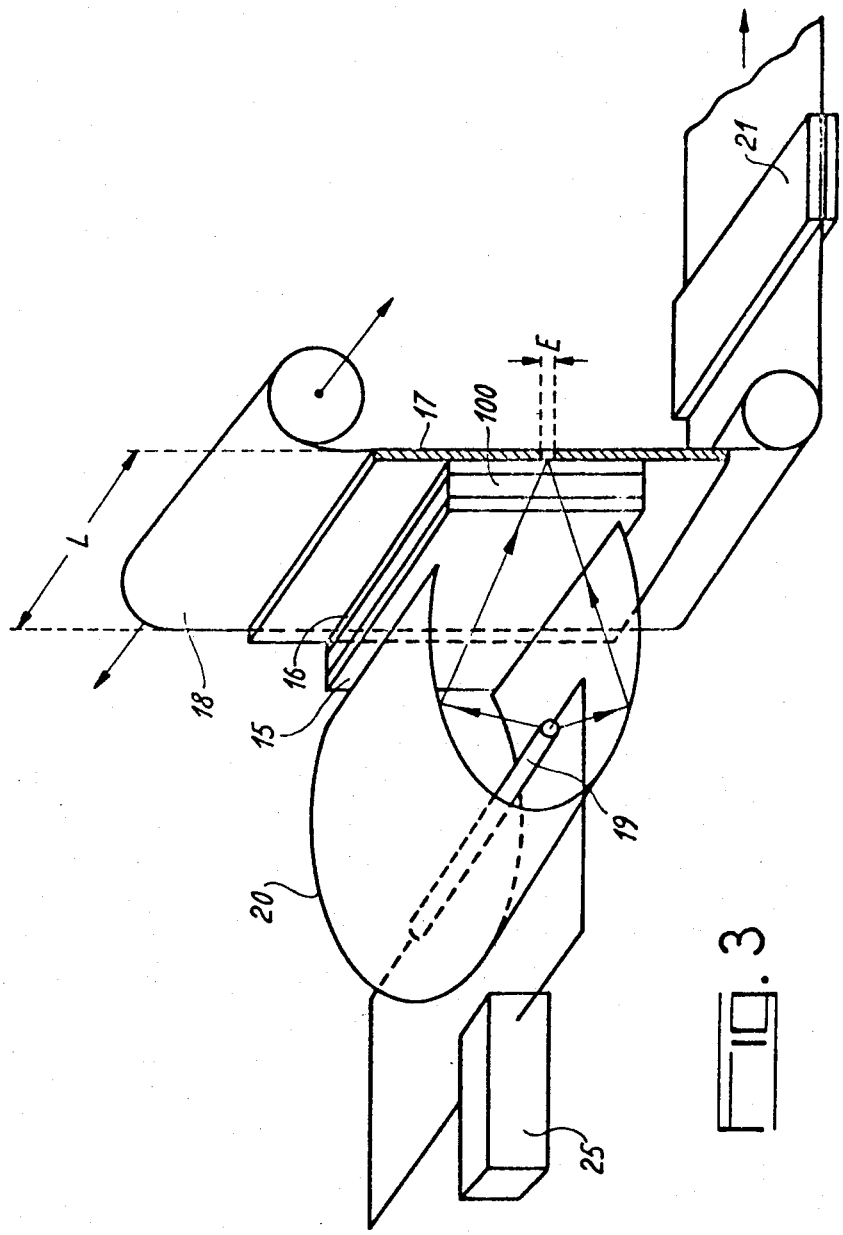

OPTICAL APPARATUS FOR THE REPRODUCTION OF IMAGES USING A LIQUID CRYSTAL CELL

BACKGROUND OF THE INVENTION

The invention relates to the reproduction of images which have previously been analysed and coded in the form of electrical signals corresponding to the analysis points, and relates more particularly to an optical apparatus for the reproduction of images on paper using a nematic liquid crystal cell and an optical telecopier comprising such a reproducing apparatus.

A number of types of image reproducing apparatus exist at present, which can be used in particular for telecopying. Their structures are determined by characteristics which depend on their field of use. For use in the professional or semi-professional field, when a large number of documents are to be copied, the apparatus may be fairly costly but should use an inexpensive standard or special paper. On the other hand, for use by the public, when the number of documents to be copied is fairly small, the apparatus used should be cheap even if a more expensive special paper is used.

BRIEF SUMMARY OF THE INVENTION

This invention relates to apparatus of the latter kind. It concerns an optical image-reproducing apparatus which can be used in a telecopier, in particular, comprising a light source and an associated optical device forming a line of light the length of which is equal to the width of the paper to be printed, this paper travelling at right angles to the line of light. An optical modulator of the same length as the line of light is formed by a nematic liquid crystal cell comprising a counter electrode and an electrode engraved to form N electrodes aligned along the cell (corresponding to the N points of a line on the paper which is to be printed) and two polarisers, and makes it possible for the radiation which is transmitted to the light-sensitive paper to be modulated spatially according to the N points. In fact, the liquid crystal placed between the two polarisers is capable of causing, or not causing, extinction of the radiation at the output from the second polariser, depending on whether no electric field is applied or, on the other hand, whether an electrical field is applied between the counter electrode and each of the electrodes corresponding to the different points forming the line.

The invention also relates to an optical telecopier comprising an optical image-reproducing apparatus of this kind.

BRIEF DESCRIPTION OF THE DRAWINGS

The invention will be more readily understood and further features thereof will become apparent from the following description referring to the accompanying drawings, wherein:

FIG. 1 shows an optical modulator comprising a nematic liquid crystal cell using the effects of electrically controlled double refraction, FIG. 1a showing this cell without a field applied thereto and FIG. 1b showing this same cell with a field applied thereto.

FIG. 2 shows an optical modulator comprising a twisted nematic liquid crystal cell, using the switching effects brought about by the field effect; FIG. 2a shows this cell without a field applied thereto and FIG. 2b shows the same cell with a field applied thereto.

FIG. 3 is a diagram of the entire reproducing apparatus according to the invention.

DETAILED DESCRIPTION OF THE PREFERRED EMBODIMENTS

Figure 4:
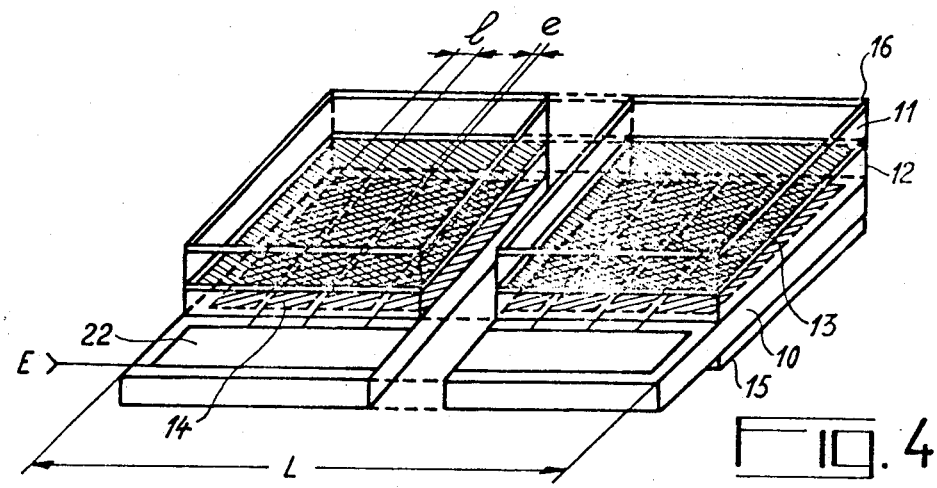
FIG. 4 diagrammatically shows the optical modulator used in the image reproducing apparatus.

The cell uses a thin film (of the order of 15 $\mu$m thick) of nematic liquid crystal which is transparent in the absence of an applied electrical field and functions either by electrically controlled double refraction or by switching by the field effect of a twisted nematic film. These two methods of operation which are known in the field of liquid crystals are explained briefly hereinafter with reference to FIGS. 1 and 2 which show, respectively, a cell operating by electrically controlled double refraction and a cell operating by means of a twisted nematic liquid crystal.

In the first case, the cell comprises a nematic liquid crystal with negative dielectric anisotropy, the elongated molecules of which are oriented perpendicularly to the walls of the cell, by appropriate doping, in the absence of a field (FIG. 1a); in the presence of an electrical field, these molecules pivot so that their large axis and hence the optical axis of the medium is perpendicular to the field $\vec{E}$ applied (FIG. 1b), except for the molecules near the walls, which remain perpendicular to these walls. Thus, in the absence of a field, the medium acts as a uniaxial isotropic medium with no effect on the radiation, and when this cell is placed between two intersecting polarisers 15 and 16 with the directions $P_1$ and $P_2$, the radiation transmitted is zero. In the presence of a field, provided by an alternating voltage source with a frequency of between 3 and 5 kHz, for example, once the molecules have pivoted, radiation of polarisation $P_1$ at the input of the cell (imposed by polariser 15) emerges from the cell with an elliptical polarisation which thus has a component along the polarisation axis $P_2$ of the second polariser 16. Consequently, at least some of the incident radiation emerges from the second polariser in the presence of a field. The intensity of the radiation transmitted is a function of the voltage applied. Moreover, the response of a cell of this type is strongly coloured, some components of the spectrum being extinguished, for a given voltage level, when the cell is illuminated with white light at a quasi-normal incidence. This coloration does not prevent a light sensitive paper arranged behind the cell from being printed. Moreover, it is possible to place, between the cell and the light-sensitive paper, a filter which selects a wave length transmitted when a field is applied, for which the paper has good sensitivity.

The crystal may also have a positive dielectric anisotropy. In this case, the molecules are anchored parallel to the walls and pivot under the effect of an applied field in order to orient themselves perpendicularly to the walls. A cell of this kind placed between two intersecting polarisers, the first polariser having an axis parallel to the direction of anchoring, makes it possible to obtain extinction of the radiation in the absence of a field and to achieve at least partial transmission of the radiation in the presence of a field.

In the case of a liquid crystal cell using a twisted nematic crystal (FIG. 2), the liquid crystal is a crystal with positive dielectric anisotropy, the molecules of which pivot under an applied field $\vec{E}$ so that their large axis is parallel to the field applied. Thus, in order to ensure that this pivoting actually occurs, the molecules must be oriented parallel to the walls in the absence of an applied field. Moreover, to obtain the polarisation switching effect, by the effect of the twisted structure, the molecules of the liquid crystal are anchored to the walls, by friction or by means of a surfactant, in two orthogonal directions $D_1$ and $D_2$ (FIG. 2a). The regular arrangement of the molecules is thus obtained with a helical structure. The guiding, by this helix, of a wave of linear polarisation $P_1$ parallel to the direction of anchoring $D_1$ is manifested by the shifting of the polarisation plane along the helix, and when the two directions of anchoring are orthogonal, the rotation of polarisation in the absence of a field is equal to $\pi/2$. On the other hand, when a field is applied between the electrodes, the molecules pivot to orient themselves in the direction of the field, except those which are near the walls. Consequently, the optical activity of the nematic film disappears and hence so does its rotating power and the radiation is transmitted by the cell without any rotation of polarisation, as in a uniaxial isotropic medium. If the two polarisers are oriented in the same direction $P_1$ parallel to $D_1$, the radiation transmitted by the second in the absence of a field is zero, as the polarisation has rotated through $\pi/2$, crossing the nematic film. On the other hand, in the presence of an applied field, when the molecules have pivoted in the direction of the field, the optical axis is perpendicular to the electrodes and the transmission is maximum.

The optical modulator used in the telecopier according to the invention uses a nematic liquid crystal cell operating according to one or other of the two methods mentioned above, the anchoring of the molecules to the walls of the cell being obtained by friction or by means of an appropriate surfactant, or using a dope added to the liquid crystal in order to obtain the desired configuration. The polarisers are suitably oriented in relation to the cell, i.e. they intersect for a cell operating by electrically controlled double refraction and they are parallel for a twisted nematic liquid crystal cell.

The optical image-reproducing apparatus according to the invention functions with line-by-line printing. The document to be copied is analysed into a certain number of lines formed by dots, i.e. 1200 lines of N=1700 dots each for a page with a height H of 29 cm and a width L of 21 cm. The dots thus analysed are transmitted in the form of series binary elements (for black and white printing) and may be regrouped by a parallel series converter into groups of N dots forming a line.

Figure 5:
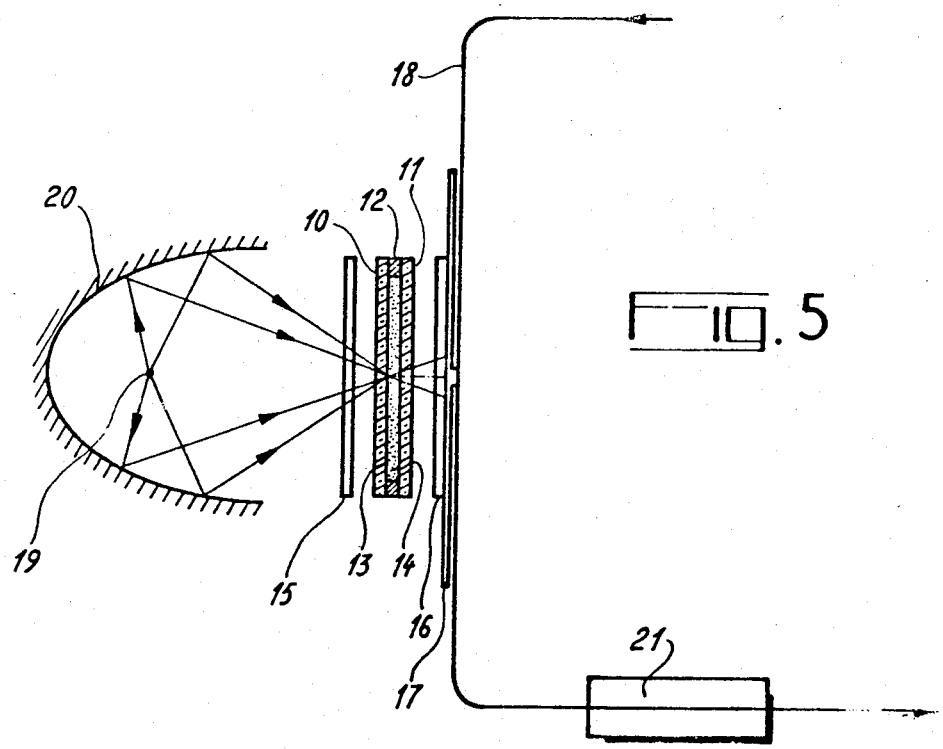
FIG. 5 is a sectional view of the apparatus shown in FIG. 3, showing the optical path of the radiation which prints the paper.

This apparatus, diagrammatically shown in FIG. 3, comprises a liquid crystal cell 100 the length of which is equal to the width of the paper to be printed, forming an optical modulator for a line of light the length of which is identical to the width of the paper. For this purpose, the cell 100, shown in greater detail in FIGS. 4 and 5, comprises two glass substrates 10 and 11 held at a spacing from each other by a joint 12 of constant thickness (15 μm, for example) forming with the substrates 10 and 11 a cavity into which a nematic liquid crystal is placed. The surfaces of the glass substrates 10 and 11 on the inside of the cell are provided, respectively, with a transparent counter electrode 13 and an electrode engraved to form N independent transparent electrodes such as 14, these electrodes having a width 1 and being at a spacing of e.

By way of example, for N=1700 dots, the width 1 of the electrodes may be equal to 100 μm and their spacing e may be 25 μm. On the substrate carrying the N electrodes, it is possible to integrate the connections required to supply these electrodes, and a parallel series converter (or a plurality of converters) intended to receive at one input a succession of signals which are to be distributed to the different electrodes. For this, the substrate carrying the electrodes, namely the substrate 10, has dimensions which are larger than those required for the liquid crystal cell, and on the part which does not form a wall of this cell the parallel series converter (or converters) 22 is (or are) integrated using the techniques used for the production of thin film transistors on an amorphous or crystalline semiconductor substrate.

This cell is placed between two polarisers 15 and 16 which can be made in the form of thin films (10 μm) and stuck to the two outer surfaces of the cell.

A mask 17 having a slot with a length L and width E, which are equal to the length and width, respectively, of a line for analysis, is placed against the second polariser. The light-sensitive paper 18 travels behind this mask 17.

The light source is a lamp 19 the length of which is greater than or equal to L, emitting white light, and supplied by a device 25. This lamp may have a power of the order of 20 W, such power making it possible to print light-sensitive paper of the "Dry Silver" type by a flash of light lasting 1 ms when the light emitted is concentrated on the line which is to be printed. Owing to the time constant of the nematic liquid crystal which is necessary to ensure that the molecules pivot during any change in the voltage applied (of the order of 100 ms), the operating cycle of the lamp may be 10 flashers per second. This cycle and the period of exposure (1 ms) enable the paper to travel continuously at a speed equal to 2.5 mm/s without any disadvantage, the width E of a line being equal to 250 μm. To ensure that the optical modulator thus produced functions satisfactorily, the flashes should occur when the liquid crystal has reached a stable state, i.e. just before the fluctuation in the control voltage applied between the counter electrode and the electrodes.

To provide a concentration of the radiation emitted by the lamp on to the paper, the optical image-reproducing apparatus comprises a mirror 20 which is elliptical in straight section. The lamp 19 is placed along a first focal line of this mirror and the slot in the mask 17 is placed along the second focal line of this mirror of elliptical cross section. Thus, the radiation emitted by the lamp is concentrated towards the slot in the mask 17 and hence on the paper moving past behind this mask. Moreover, because of the elliptical form, wherein the dimension of the large axis of the ellipse is considerably greater than that of the small axis (fairly flat ellipse), the radiation received by the cell is radiation distributed in a small aperture which is comparable with pseudo-parallel radiation. This small aperture is necessary to ensure that the liquid crystal modulator functions correctly owing to the fact that the direction of the optical axis of the liquid crystal is orthogonal relative to the walls of the cell in one of the two states and because the action of the liquid crystal on the radiation depends directly on the direction of propagation of the radiation.

The light-sensitive paper printed by the light is then developed in an oven 21 where developing is carried out in the dry, hot state for papers of the "Dry Silver" type. It is also possible to use any other light-sensitive paper whose characteristics are compatible with the use of the reproduction apparatus described hereinbefore.

In the embodiment of the optical image-reproducing apparatus described above, the N electrodes aligned along the length of the liquid crystal cell are assumed to be formed on an insulating substrate. A structure of this kind results in a vertical weft effect caused by the spacing between the electrodes. In fact, even if a certain number of consecutive dots are in the same state and correspond to the registration of a continuous element in the line, the light is not transmitted by the cell in the spaces of width e between the different dots. In order to reduce this vertical weft effect, it is possible to form the electrodes on a transparent, semi-insulating but not insulating substrate of the polycrystalline sapphire or corundum type. Thus, between two consecutive electrodes, the substrate will be brought to an intermediate potential which diminishes the contrast between the dots recorded and the spaces when these dots are in the same state of illumination.

The invention is not limited to the embodiment described and shown. In particular, the lamp used in the optical apparatus is described as a discontinuously emitting lamp, e.g. emitting at a rate of 10 flashes per second. It is also possible to use a continuously emitting lamp, whilst the optical modulator receives the light only during periods of 1 ms as defined hereinbefore through a mechanically controlled shutter.

Moreover, the optical apparatus described for forming a line of light by means of a beam with a small angle of opening on the optical modulator and the light-sensitive paper has been described as comprising a mirror of elliptical section. This construction is not restrictive and any optical apparatus by means of which the radiation can be concentrated into a line of light from a beam with a small angle of opening may also be used.

Finally, as regards the respective sizes of the document analysed and the paper to be printed, it has been assumed that they were of the same size and that the dimensions of a dot analysed on the document to be reproduced and a dot to be printed were identical. In practice, the page to be reproduced may be reduced or enlarged (keeping the same arrangement) by forming a number of dots on the light-sensitive page which is equal to the number of analysed dots on a line of a page which has been analysed, the width of the light-sensitive paper being different from the width of the analysed page. Finally, the image reproducing apparatus described above may also be associated with a device for processing the signals obtained from the analysis, in order to modify the layout of the document reproduced compared with the document analysed which is transmitted to the telecopier in the form of signals.

The invention is not limited to the embodiments described and various modifications can be made thereto without passing beyond the scope of the invention.

What is claimed is:

1. An apparatus for reproducing onto light sensitive paper an image coded as an electrical signal, comprising:
   a light source,
   projection means for forming a line of light from said light source for exposing said paper;
   a linear array of N liquid crystal cells optically interposed between said projection means and said light sensitive paper for modulating the intensity of light transmitted by said cells to said paper, each cell comprising a layer of nematic liquid crystal and electrode means for controlling the transmissivity of the cell and therefore the intensity of light from said projection means transmitted therethrough;
   means for transporting said paper past said linear array of liquid crystal cells, so that for any particular position of said paper, light transmitted by said array of N cells defines one line of said image to be reproduced onto said paper;
   series-parallel conversion means for receiving said coded electrical signal defining the image to be reproduced and providing to said cells, set of N simultaneous control voltages, each set of control voltages corresponding to one line of said image, one control voltage of ech set being coupled to one of said N cells, each set of control voltages being applied across said cells for a first predetermined duration of time, said sets of control voltages being applied one after another at fixed intervals of time; and
   means for causing said light source to emit flashes of light, synchronized with the application of sets of control voltages by said series-parallel conversion means to said cells, each flash having a second predetermined duration substantially shorter than said first predetermined duration and occurring substantially near the end of said first duration, allowing time for said cells to reach a point of maximum contrast define a line of said image, whereby a line of said paper is exposed by a flash of light modulated at maximum contrast by said cells.

2. An apparatus according to claim 1, wherein said cells comprises cells that operate by electrically controlled double refraction.

3. An apparatus according to claim 1, wherein said cells comprise twisted nematic liquid crystal cells.

4. An apparatus according to claim 1, wherein said light source comprises a linear source; said projection means comprises a mirror of elliptical cross section having a first and a second focal line; said linear source being arranged along said first focal line; the radiation emitted by said source being concentrated by said mirror and directed toward said cells and paper.

5. An apparatus according to claim 1, further comprising a mask positioned between said liquid crystal array and said paper; said mask having a slot for passing light extending parallel to said array.

6. An apparatus according to claim 1, wherein said nematic layer is positioned between two transparent sheets having inner and outer faces; said electrode means comprising transparent electrodes supported by said inner faces; and wherein said cells further include polarizer means stuck to said outer faces.

7. An apparatus according to claim 6, wherein said series parallel conversion means are integrated on one of said sheets.

* * * * *